Figures 1, 2, 3:
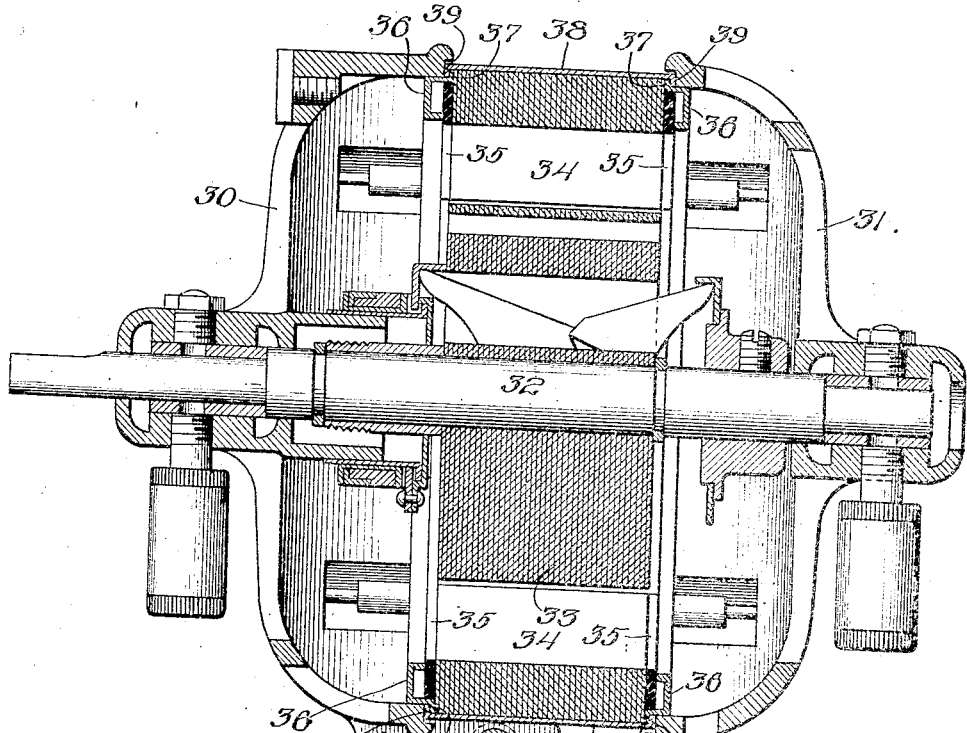

E. S. PILLSBURY.
DYNAMO ELECTRIC MACHINE.
APPLICATION FILED JAN. 19, 1912.

1,122,633.

Patented Dec. 29, 1914.

Witnesses:
Edythe M. Anderson
F. W. Plnell.

Inventor:
Edwin S. Pillsbury
by Sheridan, Wilkinson, Scott & Richmond
Attys.

UNITED STATES PATENT OFFICE.

EDWIN S. PILLSBURY, OF ST. LOUIS, MISSOURI, ASSIGNOR TO CENTURY ELECTRIC COMPANY, A CORPORATION OF MISSOURI.

DYNAMO-ELECTRIC MACHINE.

1,122,633.      Specification of Letters Patent.      Patented Dec. 29, 1914.

Application filed January 19, 1912. Serial No. 672,150.

*To all whom it may concern:*

Be it known that I, EDWIN S. PILLSBURY, a citizen of the United States, residing at the city of St. Louis and State of Missouri, have invented certain new and useful Improvements in Dynamo-Electric Machines, of which the following is a specification.

The principal object of my invention is to provide a new and improved construction for assembling the laminated iron of a dynamo electric machine.

Another object of my invention is to provide a structure for assembling the laminæ of the stator of an electric generator or motor.

A further object of my invention is to provide means by which stator laminæ of a dynamo electric machine may be assembled compactly in a bundle and thereafter in this unit form combined in building up the machine as a whole.

These objects and various others will be appreciated in connection with the following specification and claims, taken with the accompanying drawings, which illustrate two specific embodiments of my invention.

Referring to these drawings—Figure 1 is an axial section of an electric motor embodying my invention; and Fig. 2 is a fragmentary detail section showing one of the fastening screws. Fig. 3 is a perspective view of a nut for a fastening screw.

Referring to Fig. 1, the stator laminated iron bundle 34 contained in the drawn steel shell 38 constitutes an element of the stator frame. The end plates 30 and 31 of the motor carry the journal bearings for the rotor shaft 32 with the rotor 33 mounted thereon. The stator laminated iron is designated 34 and is bounded on each side by rings of insulating material 35. Sheet metal rings 36 having the shape in cross section shown in the drawing are assembled with the laminated iron 34. Each ring 36 has an outside flange 37 over which the end lip 39 of the steel shell 38 extends. The mode of assembling the parts is as follows: The drawn steel shell 38 is originally prepared with the lip 39 at one end, but the other edge projecting uniformly in the general direction of the wall 38 of the shell as a whole. At this stage the shell 38 may be spoken of as a cup. Into this cup one ring 36 is dropped and its outwardly directed flange 37 rests on the inwardly directed flange 39 of the cup 38. Next the nuts 40 are dropped through holes in the ring 36 so that their heads 41 lie in the channel of this ring 36. Then the insulating ring 35 is dropped into place resting on the ring 36, and on top of that, within the shell 38, are piled the steel laminations 34. On top of this pile is placed the other insulating ring 35 and then the ring 36 with the nuts 40 projecting therethrough, the heads 41 of these nuts lying in the channel of this other ring 36. Finally the projecting edge of the shell 38 is spun down over the flange 37 of the ring 36. In this way the steel laminæ are completely assembled, and the shell 38 which holds them also holds the rings 36 which afford seats for the heads of the nuts 40. Next the end plates 30 and 31 with the armature mounted therein are clamped in place by the bolts 42 engaging the nuts 40.

The lug 43 on the end plate 30 affords a pivotal connection between the stator frame and the base 44. Assuming that the motor shown is a fan motor, the fan can be tilted at any desired vertical angle of adjustment by means of this pivotal connection with the lug 43. The joint 45 permits adjustment around a vertical axis so that the blast of the fan can thereby be directed as desired.

I claim:

1. In a device of the class described, a bundle of laminæ punched from sheet iron, annular end plates with annular channels therein adjacent to the bundle of laminæ on each end thereof, a steel shell embracing the laminæ and the outer edges of the annular end plates, end frames beyond the annular end plates, screws passing through holes in said end frames and directed toward said annular end plates, and nuts engaging said screws, said nuts having heads lying in the channels of the annular end plates and having portions projecting through holes in said annular end plates.

2. In a device of the class described, a bundle of laminæ punched from sheet iron, sheet metal end plates on the ends of said bundle, each said plate having an annular channel opening toward the bundle and having holes in the bottom of such channel, screw-threaded nuts projecting through said holes and with heads lying in the said channels, end frames and bolts projecting through holes in the end frames and engaging said nuts.

3. In a device of the class described, a bundle of laminæ punched from sheet iron, a drawn steel shell embracing them, the edges of the shell being turned over the laminæ to clamp them, rings with respective channels engaged by said turned over edges of the shell, end frames, and fastening means engaging the end frames to the rings, said rings having channels in which portions of said fastening means lie.

In testimony whereof, I have subscribed my name.

EDWIN S. PILLSBURY.

Witnesses:
H. W. JEANNIN,
JOHN F. CHZAN.